United States Patent [19]

Hume, III et al.

[11] Patent Number: 4,608,111

[45] Date of Patent: Aug. 26, 1986

[54] BONDING METHOD EMPLOYING AN ADHESIVE WHICH CONTAINS IN AN AQUEOUS BASE AN EFFECTIVE AMOUNT OF POLYVINYL ALCOHOL AND A LIGNIN SULFONATE

[75] Inventors: Robert M. Hume, III, Cottage Grove; Robert A. LaBrash, Roseville; Michael J. Vander Giessen, Blaine, all of Minn.

[73] Assignee: H. B. Fuller Company, St. Paul, Minn.

[21] Appl. No.: 773,456

[22] Filed: Sep. 9, 1985

Related U.S. Application Data

[62] Division of Ser. No. 600,400, Apr. 16, 1984, Pat. No. 4,564,649.

[51] Int. Cl.$^4$ ............................................. C09J 3/28
[52] U.S. Cl. .............................. 156/306.6; 156/306.9; 156/327
[58] Field of Search ................... 156/306.6, 306.9, 327

[56] References Cited

U.S. PATENT DOCUMENTS

| | | | |
|---|---|---|---|
| 1,464,940 | 8/1923 | Loffler . | |
| 2,242,601 | 5/1941 | Wallace | 134/79 |
| 2,443,889 | 6/1948 | Bruce et al. | 260/17.5 |
| 2,457,357 | 12/1948 | Fenn | 524/72 |
| 2,544,585 | 3/1951 | Bruce et al. | 524/72 |
| 2,579,481 | 12/1951 | Fenn | 260/17.5 |
| 2,579,483 | 12/1951 | Fenn | 260/17.5 |
| 2,954,353 | 9/1960 | Bruce et al. | 260/17.5 |
| 3,314,807 | 4/1967 | Blackmore | 106/127 |
| 3,376,240 | 4/1968 | Childers et al. | 260/17.5 |
| 3,395,033 | 7/1968 | Remer | 106/12.3 |
| 3,592,883 | 7/1971 | Kawabuko | 264/29 |
| 3,619,222 | 11/1971 | Werle | 106/23 |
| 3,632,362 | 1/1972 | Urushiyama | 106/23 |
| 3,826,663 | 7/1974 | Minicozzi et al. | 106/90 |
| 3,884,862 | 5/1975 | King | 524/510 |
| 4,193,814 | 3/1980 | Shen | 106/123 |
| 4,265,846 | 5/1981 | Shen | 264/109 |
| 4,276,077 | 6/1981 | Zaslavsky et al. | 71/64 |

FOREIGN PATENT DOCUMENTS 1101625 5/1981 Canada .

OTHER PUBLICATIONS

Lignosite Lignin Products Technical Bulletin Lignosite 458 Technical Bulletin.
Air Products Brochure—Vinol Polyvinyl Alcohols.
ITT Rayonier Brochure—Lignins.
Kirk-Othmer, "Encyclopedia of Chemical Technology", vol. 23, pp. 848-865.
Browning, "The Lignosulfonate Challenge", App. Poly. Symposium.
Lignosite Composition and Properties Technical Bulletin.
Lignosite 17 Technical Bulletin.

*Primary Examiner*—Earl Nielsen
*Attorney, Agent, or Firm*—Merchant, Gould, Smith, Edell, Welter & Schmidt

[57] ABSTRACT

An aqueous adhesive possessing sufficient adhesion, tack, open time, thermal stability, biological stability, dimensional stability, flexibility and adhesion contains in an aqueous base a polyvinyl alcohol and lignin sulfonate, wherein there are about 1 to 8 parts of the lignin sulfonate per each part of the polyvinyl alcohol.

4 Claims, No Drawings

BONDING METHOD EMPLOYING AN ADHESIVE WHICH CONTAINS IN AN AGUEOUS BASE AN EFFECTIVE AMOUNT OF A POLYVINYL ALCOHOL AND A LIGNIN SULFONATE

This is a division of application Ser. No. 600,400, filed Apr. 16, 1984, now U.S. Pat. No. 4,564,649, issued Jan. 14, 1986.

FIELD OF THE INVENTION

The invention relates to aqueous adhesives that can associate with or bind many types of surfaces, can form exceptionally high tack upon application, can have an extended open time, and can be thermally, dimensionally and biologically stable. More particularly, the invention relates to an aqueous adhesive having components that can interact and display a unique set of properties that can be adjusted or varied for a variety of applications including cover pick-up and casemaking in book manufacture.

BACKGROUND OF THE INVENTION

In many manufacturing processes, adhesives having high tack, an extended open time, pot stability, and dimensional and biological stability after use are needed. Specifically, in the manufacture of books such as catalogs or paper covered books, during which two or more preliminary page assemblies, signatures, which include approximately 10 to 40 pages, are brought together in a first step in book manufacture. The signatures are clamped and held, stacked, rough cut to form the shape of the book, and a small film of primer is applied to the signature backs. The primer provides a surface that can readily accept additional adhesives used in book assembly and can also act in providing a flexible hinge-like film on the spine of the book. The primer is dried and a pick up adhesive is applied to the dry primer film. The pick up adhesive must have sufficient open time and rapid tack such that a light contact between the adhesive and the cover is sufficient to initially bond the cover to the signature back with sufficient integrity such that the cover remains in place without additional attachment means until the book can be finished in subsequent manufacturing stages in which the cover can be crimped and trimmed, completing the manufacture.

In the manufacture of hard cover books, in an operation known as case making, cover materials, generally fabric or coated fabric, are applied onto a cardboard cover material having two cardboard endboards connected with a center strip to form the hard book cover. Typically the adhesive is coated on the cover material and the end boards are contacted with the adhesive coating. After application, the cover material is folded back over the cardboard and is held in place by the adhesive. Just after manufacture, the cover material has the tendency to spring back or unfold and return to its original flat state. In order to prevent spring back, the case making adhesive needs to have a quick high tack. At least 4 to 10 seconds of open time is needed to provide enough time for assembly. After the cover is assembled and attached to the book, changes in humidity in the book environment and changes in the adhesive due to age can result in dimensional instability, resulting in a warpage or curling of the book cover.

In the past, animal glues have been used in book manufacture in steps such as cover pick up and case making operations. Animal based protein containing glues have adequate adhesive properties and have the benefits that they are moderate in cost and can be used in the cover pick up operation. Animal glues often do not seriously smear or stick to cutting means during book manufacture. However animal glues have certain drawbacks. Animal glues commonly gel at about 150° F. At the gel point the glue changes from a fluid to a rapidly setting gel. The gel can become an adhesive after the water in the gel is removed during evaporation, but before evaporation the gel has low tack and little adhesion. Further, animal glue tends to be subject to substantial heat degradation resulting in a short pot life. The animal glues often can have an extremely short open time, and after drying can be inflexible. Further, animal glues exposed to high or low humidity can fail to be operative since in high humidity the animal glue dries much too slowly, while in low humidity rapid evaporation can remove an excess of water from the glue resulting in substantial loss of adhesion and flexibility. Animal glues fail to wet many surfaces which can result in non-uniform bonding and are incompatible with many substances used in book manufacture. Book covers made with animal glue can have dimensional instability in changing conditions of humidity, and can be subject to biological attack by insects and microorganisms.

Accordingly, a substantial need exists for a wholly synthetic replacement for animal glue. Further, a substantial need exists for a replacement for animal glue in paperback and hard cover book manufacture.

BRIEF DESCRIPTION OF THE INVENTION

We have found an aqueous adhesive containing a lignin sulfonate composition and a polyvinyl alcohol composition, wherein there are about 1 to 8 parts of the lignin sulfonate composition per each part of the polyvinyl alcohol composition, having substantially improved heat and biological stability, extended pot life, easy clean up, low odor, improved machining, elevated tack, extended open time, and have a substantially lower cost. After manufacture the synthetic adhesives can be dimensionally stable, biologically stable and flexible.

Lignin sulfonates and polyvinyl alcohols have been used in many differing compositions having adhesive properties for many years. Loffler, U.S. Pat. No. 1,464,949, Blackmore, U.S. Pat. No. 3,314,807, Remmer, U.S. Pat. No. 3,395,033, and Werley, U.S. Pat. No. 3,619,222 each teach combining lignosulfonate with animal glue to form an adhesive. Wallace, U.S. Pat. No. 2,242,601 teaches a coating composition based on an oxygenated organic solvent containing cellulose ester, lignin, plasticizers, and resins. Bruce, U.S. Pat. No. 2,443,889, Fenn, U.S. Pat. Nos. 2,579,481 and 2,579,483, and Bruce, U.S. Pat. No. 2,954,353 teach adhesive compositions containing a lignin sulfonate and a polyvinyl alcohol at proportions of less than one part by weight of a polyvinyl alcohol per each 10 parts of a lignin sulfonate. At these proportions, the compositions have some adhesive properties but simply do not possess sufficient quick tack adhesion and adaptability to be useful in many applications including book manufacture.

A first aspect of the invention relates to the lignin sulfonate polyvinyl alcohol adhesive composition. A second aspect relates to a method of case making using the adhesive of the invention. A third aspect relates to a method of cover pick up using the adhesive of the invention.

We do not wish to be held to a theory of action of the adhesives of the invention, however it appears to us at this time that the complex sulfonate molecule interacts with the polyvinyl alcohol molecule at the novel proportions of components in the adhesive in a surprising way to produce an adhesive having unexpected and unpredictable properties.

DETAILED DESCRIPTION OF THE INVENTION LIGNIN SULFONATE

Lignin is a major constituent of wood and woody plants comprising about ¼ of the dry weight of such materials. It appears to function as a natural plastic binder for the cellulosic fibers which make up the structural units of the plant. During the pulping process lignin is made water soluble by reaction with sulfite resulting in sulfonation. The products derived from the solubilized sulfonated lignin are referred to as lignin sulfonate. The structure of lignin sulfonate cannot be completely determined, however it appears to be a mixture of polymers containing units of aromatic rings, methoxy groups, aromatic and aliphatic hydroxyl groups and ketone and aldehyde carboxyl groups. It appears that the basic monomeric unit of lignin is a sulfonated substituted guaiacyl propane having a structure similar to the model compound whose formula follows:

Lignin sulfonates commonly contain many sulfonated compounds with a broad range of molecular weights and degrees of sulfonation. They can contain small amounts of natural sugars such as mannose, glucose, xylose, and galactose, and can contain small amounts of higher molecular weight polysaccharides. Lignin sulfonates are commonly available, from a number of commercial sources, as light brown dried powders or as viscous aqueous solutions. Lignin sulfonate has a variety of properties making it useful in dispersants, binders, sequestering (chelating) agents, flotation reagents, emulsifiers, emulsion stabilizers, water treating agents.

POLYVINYL ALCOHOL

Polyvinyl alcohol (PVA), a polyhydroxy polymer having a polymethylene backbone with pendent hydroxy groups, is a water soluble synthetic resin. It is produced by the hydrolysis of polyvinyl acetate. The theoretical monomer

does not exist. Polyvinyl alcohol is one of the very few high molecular weight commercial polymers that is water soluble. It is commonly available as a dry solid and is available in granular or powdered form. PVA grades include both the fully hydrolyzed form (99%+removal of the acetate group), a form of intermediate hydrolysis (about 98 to 91% removal of acetate group), and a partly hydrolyzed (about 90 to 85% removal of the acetate group) polyvinyl alcohol. The properties of the resins vary according to the molecular weight of the parent polymer and the degree of hydrolysis. Polyvinyl alcohols are commonly produced in nominal number average molecular weights that range from about 20,000 to 100,000. Commonly the molecular weight of commercial polyvinyl alcohol grades is reflected in the viscosity of a 4 wt-% solution measured in centipoise (cP) at 20° C. with a Brookfield viscometer. The viscosity of a 4% solution can range from about 5 to about 65 cP. Variation in flexibility, water sensitivity, ease of solvation, viscosity, block resistance, adhesive strength, dispersing power can all be varied by adjusting molecular weight or degree of hydrolysis. Solutions of polyvinyl alcohol in water can be made with large quantities of lower alcoholic cosolvents and salt cosolutes. Polyvinyl alcohols can react with aldehydes to form acetals, can be reacted with acrylonitrile to form cyanoethyl groups, and can be reacted with ethylene or propylene oxide to form hydroxy alkylene groups. Polyvinyl alcohols can be readily crosslinked and can be borated to effect gellation.

Polyvinyl alcohol is made by first forming polyvinyl acetate and removing the acetate groups using a base catalyzed alkanolysis. The production of polyvinyl acetate can be done by conventional processes which controls the ultimate molecular weight. Catalyst selection temperatures, solvent selection and chain transfer agents can be used by persons skilled in the art to control molecular weight. The degree of hydrolysis is controlled by preventing the completion of the alkanolysis reaction. Polyvinyl alcohol is made in the United States by Air Products & Chemicals, Inc. under the tradename VINOL ™, by duPont under the trade name ELVANOL ™, and by Monsanto under the trade name GELVITOL ™.

HUMECTANT PLASTICIZER

The lignin sulfonate-polyvinyl alcohol adhesives of this invention can contain a material that plasticizes the mixture. Plasticizers are defined as materials incorporated into a composition that can increase its workability and flexibility or distensability. Plasticizers that can be used in the lignin sulfonate-polyvinyl alcohol adhesives of this invention are humectant plasticizers that can maintain a sufficient plasticizing amount of water thus insuring the flexibility and toughness of the adhesive film. Preferred plasticizers for use the adhesives of this invention include hydrophilic compounds containing hydrophilic groups such as amines, amides, hydroxyls, carbonyls, etc. The most preferred group of plasticizers include polyhydroxy compounds having 2 or more hydroxyl groups and 2 or more carbon atoms. Typical examples of such plasticizers include ethylene glycol, diethylene glycol, triethylene glycol, propylene glycol, 1,2-butylene glycol, 1,4-butylene glycol, glycerine, glucose, invert sugar, glycerol monomethyl ether, polyalkylene oxides and mixtures.

FIBER

While the lignin sulfonate-polyvinyl alcohol compositions of this invention form high quality adhesives and can have a variety of properties depending on relative proportion of polyvinyl alcohol and lignin sulfonate, the solids content of the adhesive and the degree of hydrolysis and molecular weight of the polyvinyl alcohol, the bond strength and adhesion of the composition can be improved by the addition of an effective amount of fiber. Both synthetic and natural fibers can be used. Useful synthetic fibers can be made from metal, glass, graphite, nylon, polyester, polyolefin, boron, etc. Examples of natural fibers include wool, flax, bamboo, etc. A preferred fiber for reasons of ease of use and utility is a cellulosic fiber. Cellulose is a carbohydrate polymer composed of glucan units having the empirical formula $C_6H_{10}O_5$. Cellulose is the chief structural element and major constituent of the cell walls of trees and other higher plants. Cellulose is generally a white fibrous material that can be separated from other constituents of the plant cell wall including lignin, hemicellulose, pectin, and others. Cellulose can be derived from another number of sources, however cellulose derived from hard or soft wood or cotton tends to have exceptional purity and performance characteristics. The preferred form of the cellulosic fiber used in the adhesives of this invention involve elongated fibers, fiber units or fiber bundles having dimensions of from about 1 to about 100 millimeters in length and a diameter of about 0.5 to 450 microns. Since the cellulose is a polymer of repeating carbohydrate units having pendent hydroxyl groups, the hydroxyl groups can interact, by hydrogen bonds, with the polyvinyl alcohol compositions in the invention to increase the film strength of the adhesive. Further, the elongated cellulose particles can form a mesh providing a substantial increase in tensile strength to the adhesive film. In the instance that the adhesive is applied in a manner that orients the cellulosic fibers in their elongated dimension, such orientation can result in a film which in the direction of the fiber has substantial resistance to elongation while across the fibers the film has a lower tensile strength.

The lignin sulfonate-polyvinyl alcohol adhesives of this invention can also contain a variety of well known adhesive constituents including thermoplastic and thermosetting resins, natural and synthetic rubbers, boric acid and salts thereof, preservatives, antifoam agents, sequestering agents, emulsifiers, perfumes, dyes, pigments, etc.

The lignin sulfonate-polyvinyl alcohol adhesive compositions of this invention are made in an aqueous base. Typically the adhesive can contain 75 to 25 wt-% of solids and about 25 to 75 wt-% water. The solids generally comprise a polyvinyl alcohol composition and a lignin sulfonate composition wherein there are about 1 to 8 parts by weight, preferably 1 to 5 parts by weight, of the lignin sulfonate per each part of the polyvinyl alcohol. Substantially greater than 8 parts by weight of the lignin sulfonate per each part of the polyvinyl alcohol, the tack of the adhesive is not sufficiently strong to result in successful adhesion in many applications. Most preferably, the adhesive comprises about 30 to 55 wt-% solids, and contains about 2 to 5 parts of the lignin sulfonate per each part of the polyvinyl alcohol for reasons of ease of preparation and enhanced adhesive properties. Further, the adhesives are often unable to maintain sufficiently long open time to be useful in all adhesive applications. In high solids adhesives, at proportions of greater than about equal parts of polyvinyl alcohol and lignin sulfonate, the adhesive tends to increase in viscosity such that it is difficult to handle and apply.

The lignin sulfonate-polyvinyl alcohol adhesive compositions of the invention can have a viscosity that falls in a broad range including from about 2,500 to about 100,000 cP, depending on the percent solids and the ratio of lignin sulfonate to polyvinyl alcohol.

The lignin sulfonate-polyvinyl alcohol adhesives of the invention can contain an effective amount of the humectant-plasticizer which comprises about 20 to about 10 wt-% of the plasticizer in the fully compounded adhesive. Preferably, the adhesive contains a polyhydroxy plasticizer compound at a concentration of about 2 to about 10 wt-%, and most preferably, the adhesive contains an ethylene glycol, glycerine, or polyalkylene oxide plasticizer at a concentration of about 3 to about 10 wt-%.

The lignin sulfonate-polyvinyl alcohol adhesive compositions of the invention can contain the cellulosic fibers at a concentration of about 0.01 to about 25 wt-% based on the fully compounded formulation. The preferred adhesives contain about 0.5 to 5 wt-% of cellulosic fibers, and most preferably, for reasons of strength and flexibility, the adhesives contain about 1 to about 5 wt-% of a cellulose fiber made from wood.

EXAMPLE I

Into a 600 milliliter stainless steel beaker having an electrically driven blade mixer immersed in a water bath at 210° F. was placed 100 grams of a 50 wt-% dispersion of an ammonium lignin sulfonate (ORZAN AL-50, ITT Rayonier Forest Products). The mixer was started and into the agitated liquid was sprinkled gradually, at a rate to permit smooth addition, 20 grams of a partially hydrolyzed low molecular weight polyvinyl alcohol (87.0–9.0 hydrolyzed—a 4% aqueous solution of the PVOH having a viscosity of 4 to 6 cP, VINOL 205, Air Products & Chemicals, Inc.). The addition took about 1 hour, and after the addition was completed the mixture was agitated until smooth, indicating the dissolution of all the polyvinyl alcohol. At the end of the dissolution, the temperature of the mixture was about 195° F. The product had 65% by weight total solids.

A series of products were prepared by diluting the product with 5 milliliter aliquots of water resulting in products having total solids content ranging from about 58 wt-% solids to 35 wt-% total solids, a total of 18 aliquot additions.

EXAMPLE II

Example I was repeated except that a mixture of 75 grams of ammonium lignin sulfonate (AL-50) and 25 grams of a 50 wt-% aqueous solution of a sodium lignin sulfonate (ORZAN SL-50, ITT Rayonier Forest Products) was substituted for the 100 grams of AL-50.

EXAMPLE III

Example II was repeated except that 25 grams of AL-50 and 75 grams of SL-50 were used in place of 75 grams of AL-50 and 25 grams of SL-50.

EXAMPLE IV

Into a 2,000 milliliter stainless steel beaker equipped with an electrically driven blade mixer immersed in a water bath at 210° F. was placed 1,000 grams of a 50 wt-% aqueous solution of an ammonium lignin sulfonate (ORZAN AL-50, ITT Rayonier Forest Products). Stirring was initiated and into the stirred liquid was slowly added 200 grams of a partially hydrolyzed low molecular weight polyvinyl alcohol (87–89% hydrolyzed—a 4 wt-% aqueous solution which had a viscosity of about 4 to 6 cP at 20° C., VINOL 205, Air Products & Chemicals, Inc.). During the addition of the polyvinyl alcohol the solution began to generate foam and about 10 milliliters of Dow FG-10 anti-foam agent was added. The completion of the addition of the balance of the polyvinyl alcohol occurred in about ½ hour and the mixture was agitated until smooth, about 1 hour. At the end of dissolution, the temperature of the mixture was about 195° F. The product had about 58 wt-% solids.

EXAMPLE V

Example IV was repeated except that 140 grams of the VINOL 205 was used in place of 200 grams of VINOL 205.

EXAMPLE VI

Example IV was repeated except that after the addition of the VINOL 205, 50 grams of boric acid and 7 grams of citric acid were added to the mixture which was agitated until smooth.

EXAMPLE VII

Example VI was repeated except that 200 grams of boric acid and 28 grams of citric acid were used instead of 50 grams of boric acid and 7 grams of citric acid.

EXAMPLE VIII

Example II was repeated except that after the addition of the polyvinyl alcohol VINOL 205, 1,000 grams of an approximately 55 wt-% aqueous emulsion of a polyvinyl acetate homopolymer having a Brookfield viscosity at 20 r.p.m. at 25° C. of about 14,000 to 18,000 cP. (FULATEX PD-347).

EXAMPLE IX

Example VIII was repeated except that 1,000 grams of a 47 wt-% dispersion of a carboxylated copolymer of chloroprene and methacrylic acid having a minor amount of a polyvinyl alcohol dispersing agent (a NEOPRENE latex 115) was substituted for the PD-330.

EXAMPLE X

Into a 1,000 milliliter stainless steel beaker was placed 200 grams of water and 80.0 grams of a partially hydrolyzed low molecular weight polyvinyl alcohol (87–89%, hydrolyzed—a 4 wt-% aqueous solution of the polyinyl alcohol having a viscosity at 20° C. of about 4 to 6 cP, VINOL 205, Air Products & Chemicals, Inc.). The polyvinyl alcohol solid was mixed with water for 10 minutes at ambient temperatures and at the end of that period the temperature of the mixture was placed in a water bath at about 200° F. for 50 minutes under stirring using an electrically driven blade mixer. At the end of this time the VINOL had essentially completely dissolved in the water phase. Into the VINOL 205 solution at 200° F. was added 1.5 grams of Dow A preservative, 1.0 grams of DREW Y 384 anti-foam, and 145.0 grams of solid ammonium lignin sulfonate (ORZAN A). The mixture was agitated until smooth and into the mixture was added 22.5 grams of a 60 wt-% titanium dioxide pigment dispersion in water and 50 grams of glycerine (DARCHEM 88). The resulting mixture was blended until uniform. The finished adhesive had a viscosity at 160° F. of 7500 cP. The mixture was diluted until it contained 44 wt-% total solids and had a viscosity of 5300 cP.

EXAMPLE XI

Into a 1,000 milliliter stainless steel beaker was placed 182.5 grams of water and 72.5 grams of a partially hydrolized polyvinyl alcohol composition (87–89% hydrolyzed and having a viscosity of a 4 wt-% aqueous solution at 20° C. of about 4–6 cP). The VINOL mixture was agitated for 10 minutes and then placed in a water bath at 200° F. under stirring using an electrically driven blade mixer for 15 minutes. At the end of the period substantially all the VINOL 205 had been dissolved and into the solution was added 1.5 grams of DREW Y 384 anti-foam, 1.0 grams of Dow A preservative, 22.5 grams of a 60 wt-% dispersion of titanium dioxide pigment in water, 70 grams of ammonium lignin sulfonate (ORZAN A), 105 grams of sodium lignin sulfonate (ORZAN S) and 45 grams of glycerine (DARCHEM 88). The mixture was agitated at 210° F. until smooth (about 30 minutes). The final adhesive was diluted with water until its 160° of viscosity was 5500 cP. The final adhesive had a solids content of 44.9 wt-%.

EXAMPLE XII

Into a 1,000 milliliter stainless steel beaker was placed 188 grams of water, 71.5 grams of a polyvinyl alcohol (87–89% hydrolyzed, having a viscosity of a 4 wt-% aqueous solution at 200° C. of about 4 to 6 cP, VINOL 205, Air Products & Chemicals, Inc.) and 1.0 grams of DREW Y-384 anti-foam. The mixture was thoroughly dispersed in cold water and then placed in a hot water bath at about 20° F. and was mixed with an electrically driven mixer having a blade agitator for 30 minutes. Into the heated mixed solution was added 1.5 grams of Dow A preservative and 188 grams of an ammonium lignin sulfonate (ORZAN A) along with 50 grams glycerine (DARCHEM 88). The mixture was agitated until smooth. The finished adhesive was diluted to 43.5 wt-% total solids and had a viscosity profile as follows:

| Viscosity | Temperature |
| --- | --- |
| 2600 cP | 170° F. |
| 3900 cP | 160° F. |
| 5300 cP | 150° F. |

EXAMPLE XIII

Into a 15-gallon horizontal single blade ribbon mixer equipped with direct steam and steam jacket heating and variable speed mixing was charged 45 lbs. of a 50 wt-% aqueous solution of an ammonium lignin sulfonate (ORZAN AL-50, ITT Rayonier Forest Products), 0.45 lbs. of DOW A, a preservative, 0.3 lbs. of DREW Y 384, an anti-foam agent, and 20.7 lbs. of a partially hydrolyzed low molecular weight polyvinyl alcohol (87–89.0% hydrolysis and a viscosity of a 4% aqueous solution at 20° C. of about 4 to 6 cP, VINOL 205, Air Products & Chemicals, Inc.). The mixture was agitated at 15 r.p.m. until the components began to be wetted out and the agitation was increased to 30 r.p.m. The mixture was heated with direct steam and jacket steam to 170° F. at which time the direct steam was terminated and jacket steam was continued until the mixture reached 190° F. Fifteen lbs. of the 50 wt-% ammonium lignin sulfonate composition were added to the mixture and the jacket steam was initiated until the mixture reached 190° F. The mixture was maintained at that temperature for 45 minutes at 50 revolutions per minute to cause the dissolution of the polyvinyl alcohol in the adhesive composition. A premix of 14.4 lbs. of glycerine (DURA-CHEM 88), 6.75 lbs. of the 50 wt-% aqueous solution of ammonium lignin sulfonate, 11.25 lbs. of a solid particulate sodium lignin sulfonate (ORZAN S), and 0.075 lbs. of DREW Y-384 anti-foam agent was prepared separately in a 5 gallon bucket by hand. The pre-mix was agitated with a hand-held electrical drill-driven mixer until smooth and was added to the batch in the horizontal ribbon mixer. The mixture was reheated to 190° F. and mixed for 15 minutes to uniformity. Into the mixed uniform mixture was added 30 lbs. of an aqueous 50 wt-% solution of ammonium lignin sulfonate (ORZAN AL-50), along with 0.075 lbs. of the DREW Y-384 anti-foam agent. The mixture was mixed until smooth and was drawn off into 5 gallon pails. The composition contained 69 wt-% solids and had a Brookfield viscosity of 13,000 cP at 140° F.

EXAMPLE XIV

Into a 600 milliliter beaker mixer was charged 185 grams of water and 5 grams of finely divided hardwoodpulp. Into the suspension of pulp in water was added 80 grams of a polyvinyl alcohol (degree of hydrolysis 87-89%, low molecular weight, viscosity of a 4% aqueous solution about 4 to 6, VINOL 205, Air Products & Chemicals, Inc.). The hardwood-pulp, polyvinyl alcohol mixture was agitated at 180°-200° F. until uniform and into the stirred heated mixture was added slowly 175 grams of a sodium lignin sulfonate (ORZAN A-ITT Rayonier). The mixture was agitated with heating until smooth and into the smooth agitated mixture was added 55 grams of glycerine (DURA-CHEM 88). The adhesive contained 60% solids and had a viscosity of 60,000 cP at 120° F.

The above-described Examples were evaluated for quick tack, wet or green tack, speed of set, open time, and bond strength by drawing a film having a thickness of about 2.5-8 mils wet on an either ambient or heated glass plate and applying to the coating a substrate. In all cases, the lignin sulfonate-polyvinyl alcohol composition of the invention was superior to animal glues in these characteristics.

The polyvinyl alcohol lignin sulfonate adhesives of the invention were evaluated for pot life by maintaining a stainless steel beaker containing 500 grams of the adhesive at 190° F. for 4 days. Water loss by evaporation was repeatedly replaced and no appreciable loss in viscosity, quick tack, green tack, speed of set, open time, or bond strength was apparent, indicating the thermal stability of the adhesive.

The above-described adhesives can be used in virtually any application involving a water based adhesive used at elevated temperatures within a viscosity range of about 2,000 to 100,000 cP. However, these adhesives are preferred for use in the manufacture of hard back and soft cover books. In somewhat greater detail, the preparation of soft cover books including paper back books, catalogs, telephone directories, magazines, text books, etc. In the assembly of these books, signatures are prepared which are 10 to 30 page folded groups of paper. Sufficient signatures, 2 to 100 or more, can be stacked to form a rough unfinished book. The folded ends are roughed and cut to form a high surface area location for the application of adhesives. To the rough cut area is applied an aqueous dilute primer. To the primer is applied the novel lignin sulfonate-polyvinyl alcohol adhesive composition of this invention. The adhesive can be applied in any useful fashion using roller coating, spray coating, etc. to form an adhesive film of 0.1 to 100 mils in thickness. The layer of adhesive having quick tack and substantial adhesion is brought into contact with the book cover. The quick tack properties of the adhesive can hold the cover to the backbone of the book until the book assembly can be clamped and trimmed to its final form. In this application the adhesive commonly has a viscosity ranging from 12,000 to 100,000 cP.

In case making, a hard back book cover is prepared by forming a film of the adhesive between the cardboard interior of the book cover and the cover material. The cover material is folded over the back of the endboards and the adhesive holds the cover material in place. However the bent cover material is resilient and tends to spring back to its original shape. The case making adhesive requires quick tack and strong adhesion to maintain the cover material fold, preventing spring back. Further, after drying the adhesive must be dimensionally stable to prevent cover warpage. Case making adhesives commonly have a viscosity in the range of about 2,000 to 10,000 cP at 160° F.

The adhesive of this invention can be formed into films that can be used in a variety of tape splicing and lamination procedures. The adhesive can be extruded or cast into films having a thickness of about 1 to about 50 mils. The cast film can be cut into any shape including strips, dots, etc. In use they can be placed between sheet-like substrates in a splicing or laminating operation and activated by the application of heat, moisture or combinations thereof.

The above description, Examples and discussion provides a basis for understanding the invention, however since many variations and modifications of the invention can be made without departing from the spirit and scope of the invention, the invention resides wholly in the claims hereinafter appended.

We claim:

1. A method of laminating a first sheet to a second sheet which comprises:
   A. forming a non-bonded laminate by placing between said first sheet and said second sheet a thin film comprising (a) an ammonium or alkali metal lignin sulfonate composition; (b) a polyvinyl alcohol composition; and (c) cellulosic fiber; wherein there are about 1 to 8 parts by weight of the lignin sulfonate composition per each part by weight of the polyvinyl alcohol composition and the cellulosic fiber is present at a concentration of about 0.1 to 10 wt-% of the film; and
   B. applying heat to the non-bonded laminate.
2. The method of claim 1 wherein the film also contains a humectant-plasticizer.
3. The method of claim 2 wherein the humectant-plasticizer is a polyhydroxy compound.
4. The method of claim 1 wherein the cellulosic fiber is wood pulp, cotton fiber or mixtures thereof.

* * * * *

UNITED STATES PATENT AND TRADEMARK OFFICE
CERTIFICATE OF CORRECTION

PATENT NO. : 4,608,111
DATED : August 26, 1986
INVENTOR(S) : Hume, III et al.

It is certified that error appears in the above-identified patent and that said Letters Patent is hereby corrected as shown below:

In the title, for "OF POLYVINYL ALCOHOL", read --OF A POLYVINYL ALCOHOL--.

Column 1, line 2, for "AGUEOUS", read --AQUEOUS--.

Column 3, lines 8 and 9, for "DETAILED DESCRIPTION OF THE INVENTION LIGNIN SULFONATE", on line 8 (centered) read --DETAILED DESCRIPTION OF THE INVENTION--, and on line 9 (centered) read --LIGNIN SULFONATE--.

Column 6, line 21, for "(87.0-9.0", read --(87.0-89.0--.

Column 8, line 17, for "200°C.", read --20°C.--.

Column 8, line 21, for "20°F.", read --200°F.--

Signed and Sealed this

Eleventh Day of November, 1986

Attest:

DONALD J. QUIGG

Attesting Officer    Commissioner of Patents and Trademarks